United States Patent [19]

Meyers

[11] Patent Number: 4,959,145
[45] Date of Patent: Sep. 25, 1990

[54] GAS BAFFLE DEVICE FOR ON-SITE WASTE DISPOSAL SYSTEMS

[75] Inventor: Theodore W. Meyers, Inverness, Ill.

[73] Assignee: Tuf-Tite, Inc., Barrington, Ill.

[21] Appl. No.: 435,600

[22] Filed: Nov. 13, 1989

[51] Int. Cl.⁵ .......................... B01D 21/00; C02F 1/40
[52] U.S. Cl. ................................ 210/532.2; 210/170; 210/232; 210/247; 210/539
[58] Field of Search ................ 210/188, 232, 170, 247, 210/532.2, 538, 539

[56] References Cited

U.S. PATENT DOCUMENTS

| | | | |
|---|---|---|---|
| Re. 32,312 | 12/1986 | Crates et al. | 210/532 |
| 1,115,856 | 11/1914 | Nabstedt . | |
| 1,708,118 | 4/1929 | Carpenter et al. . | |
| 1,759,334 | 5/1930 | Wilson . | |
| 2,143,248 | 1/1939 | Otto | 210/6 |
| 2,213,458 | 9/1940 | Buckley | 210/6 |
| 2,692,230 | 10/1954 | Hendon | 210/6 |
| 3,031,083 | 4/1962 | Schreiber | 210/532 |
| 3,426,903 | 2/1969 | Olecko | 210/232 |
| 3,433,258 | 3/1969 | Steele | 137/590 |
| 3,630,370 | 12/1971 | Quina | 210/170 |
| 3,817,864 | 6/1974 | Carlson et al. | 210/170 |
| 3,826,376 | 7/1974 | Carlson et al. | 210/519 |
| 3,898,162 | 8/1975 | Carlson et al. | 270/170 |
| 4,097,380 | 6/1978 | Carlson | 210/170 |
| 4,172,799 | 10/1979 | Perry, Jr. | 210/532 |
| 4,334,991 | 6/1982 | Beede | 210/232 |
| 4,363,732 | 12/1982 | Crates et al. | 210/532 |
| 4,664,795 | 5/1987 | Stegall et al. | 210/202 |
| 4,832,846 | 5/1989 | Gavin | 210/532 |

OTHER PUBLICATIONS

U.S. Dept. of Commerce, National Technical Information Service brochure entitled "Design Manual: On-Site Wastewater Treatment and Disposal Systems" prepared by SCS Engineers, Inc., Long Beach Calif., for the Municipal Environmental Research Lab., Cincinnati, Ohio, dated Oct. 1980.

Undated one-page flyer from United Concrete Products, Inc. Yalesville, Conn.

Undated brochure distributed by Red Line Products, Seaforth, Ontario, Canada.

*Primary Examiner*—Charles Hart

[57] ABSTRACT

An improved gas baffle device is disclosed for use in on-site waste disposal system tanks, such as septic tanks, which can be adjustably mountable to the outlet line of the septic tank. The gas baffle device includes a mounting strap which is readily secured to a pipe extending downwardly from a sanitary tee mounted the tank's outlet line. The mounting strap carries a support post and a gas baffle plate. The baffle plate is maintained over the end of and at an angle to the opening of the sanitary tee pipe. Special connection means on the strap allow the support post to be readily interconnected thereto. This improved gas baffle device is easily and quickly field-installed into a new septic tank, or can be readily retrofitted into an existing septic tank as needed.

10 Claims, 2 Drawing Sheets

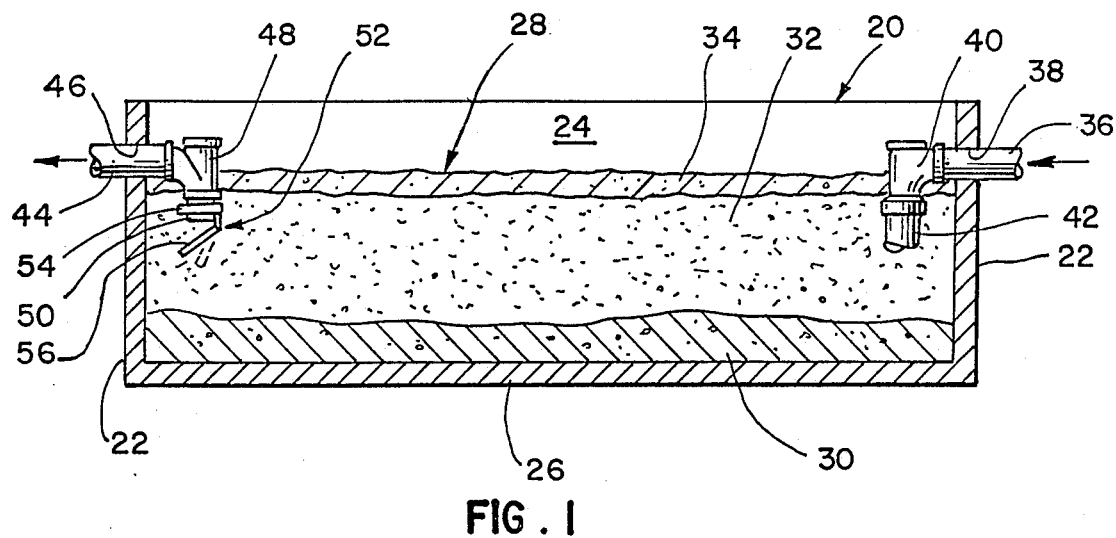
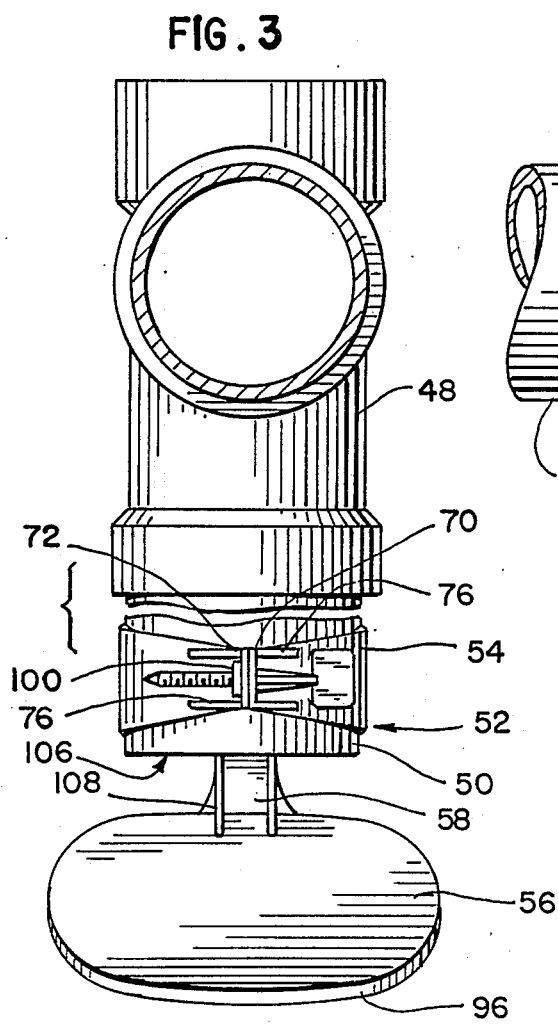
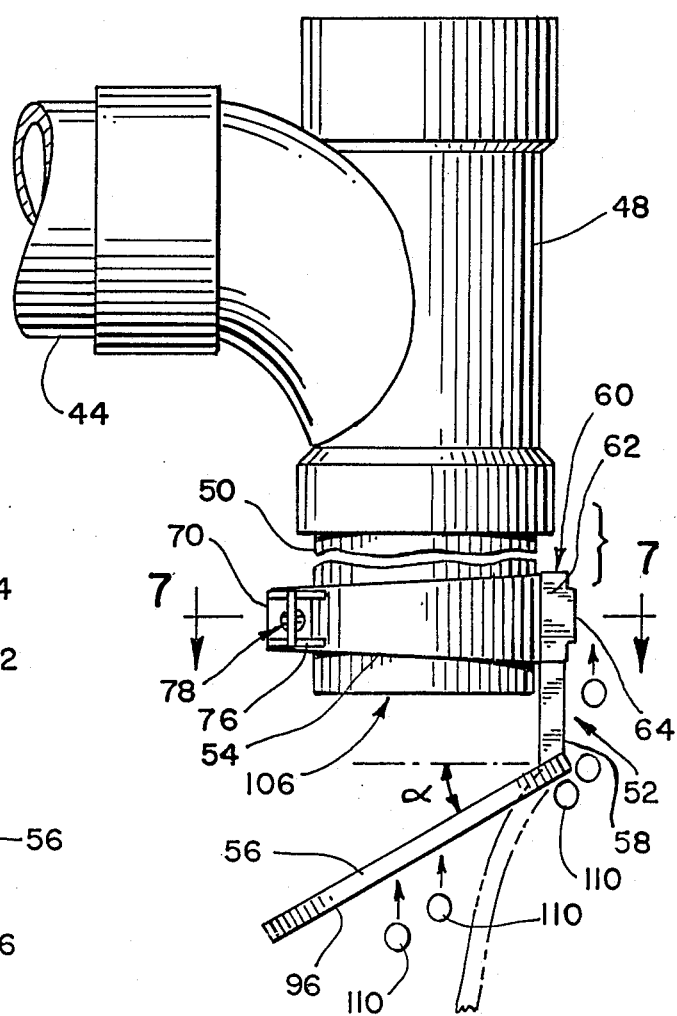

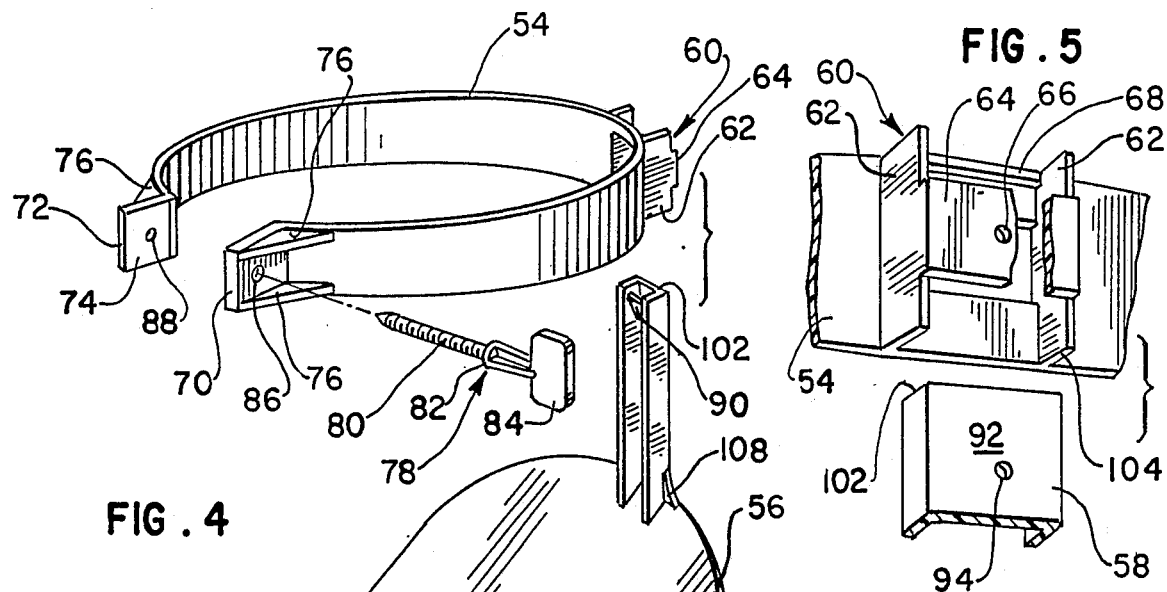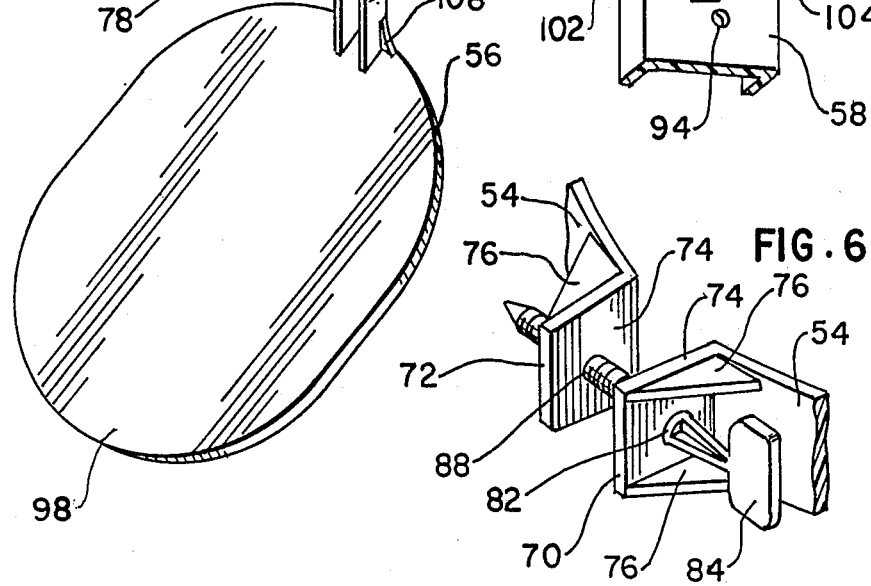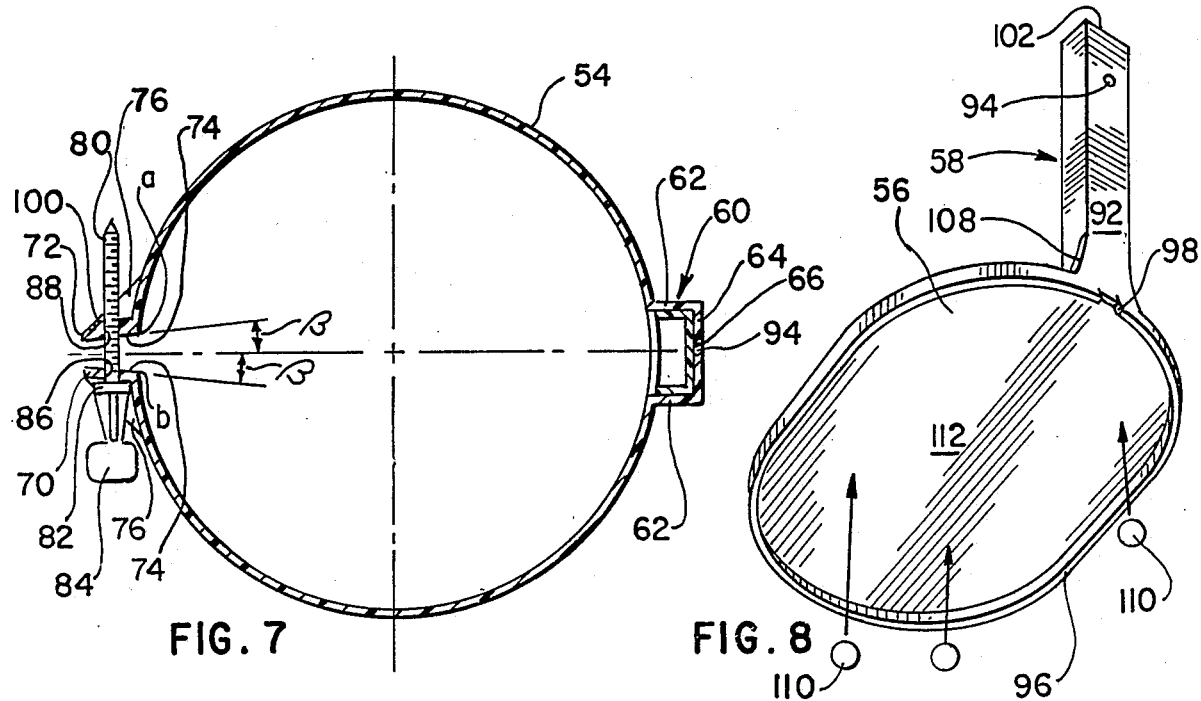

GAS BAFFLE DEVICE FOR ON-SITE WASTE DISPOSAL SYSTEMS

FIELD OF THE INVENTION

This invention relates to components for on-site waste disposal systems, such as septic systems, and more particularly, to a gas baffle device for use on the outlet pipe of a septic system tank.

BACKGROUND OF THE INVENTION

Septic system leach fields must remain free of contaminants, such as solid particles, so as to continue operating properly. However, upwardly rising gas bubbles created by the fermentation action in a septic or other on-site waste disposal tank often carry with them solid particles. These gas bubbles with carried particulate rise to the top of the tank and can be emitted through the outlet line to the leach field unless they are somehow deflected by an appropriate gas baffle or so-called gas deflection device.

There have been many prior attempts to solve this problem. These include using a specially-configured gas deflection baffles which are permanently affixed to the side of a septic tank, such as a concrete septic tank. Additionally, there have been generally diamond-shaped or other angled gas deflection devices mounted beneath a tank's outlet opening. Further, there are septic tank baffle systems which require tracks to be pre-formed in the inner sidewalls of the tank, for receiving a baffle device. Additionally, curved outlet pipes have been used as outlet gas baffle devices.

However, each of the foregoing methods for deflecting rising gas bubbles and attached solid particles have disadvantages. Those systems which have tracks pre-formed into the side of a precast concrete septic tank require the advance knowledge as to which specific sidewall opening in a septic tank (of which there normally are many) is to be the actual opening used as the outlet; otherwise, such tracks must be formed adjacent every such outlet opening. Similarly, in those devices which have deflection panels attached permanently to their sides, such structure must be attached to the appropriate outlet opening, or otherwise to every such opening.

Another problem is that many of the prior gas baffle deflection systems do not readily permit the entry of the heads of septic tank cleaning pipe units, as occurs when the tanks are periodically cleaned. Oftentimes, such cleaning heads merely break off or otherwise damage any such baffle deflection structures.

Many of the prior gas deflection devices require excessive time in installation. Others can only be installed at the septic tank manufacturing site, rather than later during the field-installation of the tank. Further, most prior gas baffle devices are not adjustable relative to the invert opening of the outlet pipe.

The foregoing problems have been overcome by the present invention. It comprises a gas baffle device which can be quickly installed in the field during installation of the septic tank. The present gas baffle device includes a flexible mounting strap, which is self-tightened so as to clamp around and be secured to a pipe extended downwardly from a sanitary tee mounted to the tank's outlet line. The present device includes a deflector plate carried, at approximately a 30° angle, to a support post, the post being securely interconnected to the mounting strap. In this fashion, the deflector plate hangs below, and at an angled relationship to, the opening of the outlet pipe extension carried by the sanitary tee. A downwardly-extending collector rim on the deflector plate acts to prevent gas bubbles from flowing out over the plate's peripheral edge. Instead, gas bubbles are channeled along the lower surface of the plate until reaching an interruption in the collector rim. There they are able to freely pass up behind and outside of the outlet pipe extension, such that unwanted fine particulates carried therewith are unable to enter the outlet line and flow into the associated leach field. The present device can be easily installed in the field in a short time without the need for any tools.

Thus, it is an object of the present invention to provide a gas baffle device for a septic tank which has an angled deflector plate which normally will cover off the outlet line opening from any influx of rising gas bubbles, but which will in the presence of septic tank cleaning apparatus, be flexibly and temporarily deflected out of the way without damage thereto.

It is a further object of the present invention to provide a gas baffle device which is inexpensive, easily be installed at the site of installation of a septic tank, and can adjustably mounted to the outlet line of a septic tank or other on-site waste disposal tank.

The means by which the foregoing and other objects of the present invention are accomplished and the manner of their accomplishment will be readily understood from the following specification upon reference to the accompanying drawings, in which:

FIG. 1 is a sectional view of a typical septic system tank, with the present invention's gas baffle structure mounted to the outlet line thereof;

FIG. 2 is an enlarged side view of the sanitary tee of FIG. 1 and depicting the present gas baffle device in more detail;

FIG. 3 is an enlarged front elevation view of the sanitary tee and gas baffle of FIG. 1;

FIG. 4 is an exploded perspective assembly view of the present gas baffle;

FIG. 5 is an enlarged rear perspective view of portions of the mounting strap and support post of the present gas baffle device;

FIG. 6 is an enlarged perspective view of the mounting strap;

FIG. 7 is a section view, taken along line 7—7 of FIG. 2, of the mounting strap; and FIG. 8 is a bottom perspective view of the baffle plate and support post.

DESCRIPTION OF THE PREFERRED EMBODIMENT

Having reference to the drawings, wherein like reference numerals indicate corresponding elements, there is shown in FIG. 1 an illustration of a septic tank 20 having end walls 22, sidewalls 24 (only one shown), and a bottom wall 26. Liquid wastewater, generally denoted by reference numeral 28, is contained within the tank 20; the wastewater 28 generally comprises three zones or layers, namely the lowermost or sludge layer 30, the relatively clear effluent or middle layer 32, and an uppermost or scum layer 34. An inlet line 36 extends through an opening 38 in the right sidewall 22 (see FIG. 1). A sanitary tee 40 is affixed to inlet line 36 at its innermost end within the tank 30, and carries a downwardly-extending inlet pipe extension 42.

Similarly, an outlet line 44, which communicates with the drain or so-called leech field (not shown), extends into the interior of the tank 20 through an opening 46 in left end wall 22. The outlet line 44 also carries a sanitary tee 48, which includes a downwardly-extending outlet pipe extension 50.

As best seen in FIGS. 1-3, the pipe extension 50 carries a gas baffle device, generally denoted by reference numeral 52. In the preferred embodiment, the gas baffle device 52 generally comprises two portions, namely a mounting strap portion 54 and an integral combination of a baffle plate 56 and a support post 58.

As shown in FIGS. 2, 3 4, and 7, the mounting strap 54 has a connection box or bracket 60 formed at the rear center thereof. The connector bracket 60 comprises sidewalls 62, rear wall 64 which has an opening 66, and an upper, rearwardly-extending stop wall 68. The two ends of strap 54 are respectively formed with gusseted screw receiver ends, generally denoted by reference numerals 70, 72. Each of the screw receiver ends 70, 72 has a facing wall 74. As seen in FIG. 7, when the strap 54 is in its mounted position, the facing walls 74 are somewhat angled one to the other (by a minor angle of $\beta$ taken off the radial center line X in FIG. 7, which angle $\beta$ in the preferred embodiment is approximately 30°); the advantage of this angled mating alignment is described more fully later herein. Each of the gusseted ends 70, 72 have gusset walls 76 for strengthening the facing wall 74 relative to the strap 54. Preferably, the entire strap 54, including the gusseted ends 70, 72 and the connector bracket 60, is formed as one integrally cast plastic piece, such as injection-molded out of polypropelene, for example.

A fastener 78, preferably made of Nylon or other suitably strong plastic material, has a threaded portion 80 and an enlarged head portion 82 terminating in a turning flange 84. In use, the threaded end 80 is placed through a pilot hole 86 formed in facing wall 74 of gusseted end 70, and then placed through an undersize hole 88 formed on facing wall 74 of gusseted end 72 (see FIGS. 4, 6 and 7).

The second major component of the gas baffle device 52, in its preferred form, besides the above-described strap portion 54, is the combination of the baffle plate 56 and support post 58, as best seen in FIGS. 2, 3, 4 and 8. The baffle plate 56 and support post 58 are preferably formed as one integral unit, such as of injection-molded polypropelene, for example. The baffle plate 56 is formed at an angle $\alpha$ relative to the horizontal, i.e., to the top of wastewater 28 (see FIG. 2). In the preferred embodiment the angle $\alpha$ is approximately 30°.

The support post 58 is generally U-channeled in shape, and has formed within it at the upper end thereof an inwardly-slanted cross support member 90. The rear surface 92 of support post 58 is formed with an outwardly-extending, ball-shaped detent dimple 94. As described more fully below, the dimple 94 is used for engaging the detent opening 66 in rear wall 64 of connector bracket 60. The underside 112 of baffle plate 56 is formed, at its peripheral edge, with a downwardly-extending collector rim 96. This rim is interrupted by an opening 98 at the uppermost portion of the undersurface 112 of plate 56 adjacent the rear surface 92 of support post 58.

I now turn to the installation and operation of the improved gas baffle device 52 of the present invention. The mounting strap 54 (which normally in the preferred embodiment will lie relatively flat prior to installation) is flexibly bent into a generally cylindrical shape so as to surround the outlet pipe extension 50 (see FIGS. 2-4 and 7). The fastener 78 is inserted into the pilot hole 86 of gusseted end 70 and then inserted through the undersized hole 88 of gusseted end 72. Fastener 78 is drawn tight by twisting the head 84. Preferably, a thickened section or boss 100 is formed on the rear surface of facing wall 74 of gusseted end 72; this is to provide more material for, i.e., provide greater holding power to, the threaded end 80 of fastener 78.

Because the strap 54 is fastened directly onto the outlet pipe extension 50 through fastener 78 and gusseted ends 70, 72, it is seen that the gas baffle device 52 can be adjustably raised or lowered relative to the vertical length of pipe extension 42. Additionally, by selecting an appropriate length for strap 54, it can be tightened about extension pipe 42 without the respective facing walls 74 of gusseted ends 70, 72 72 touching when strap 54 is completely tightened. The fact that the mating walls 74 are preferably angled towards one another yet never touch helps assure that the strap 54, when fastener 78 is properly tightened, will clamp tightly about pipe 50.

Also, because of the screw adjustment feature for tightening strap 54 to pipe 42, the present invention can be used with any of the various sizes of so-called 3" or 4" polyvinyl chloride (PVC) or other plastic plumbing pipe. For example, the baffle device 52 can be readily securely fastened onto the relatively large outer diameter 4"0 pipe known as Schedule 40, or instead to the relatively small outer diameter 4" pipe known as SDR 35. In the preferred embodiment, the length of the strap 54 (from point "a" to point "b" in FIG. 7, so as to effectively surround and tightly fasten to the circumference of any known 4" extension pipe 50) is 13.1", while the length of strap 54 (so as to accommodate the circumference of any known 3" pipe) is 10.5".

Preferably, before strap 54 has been adjustably mounted to and secured about pipe extension 50, the other component, i.e., the combination of baffle plate 56 and support post 58, should be connected to strap 54. This is done by slidably inserting the free end 102 of the support post 58 upwardly into the lowermost end 104 of the connector bracket 60. In this manner, the outermost surfaces of the U-shaped support post 58 are snuggly engaged within sidewalls 62 and rear wall 64, and detent dimple 94 on post 58 is engaged and entrapped within the mating detent opening 66 on rear wall 64. The rearwardly extending stopwall 68 on strap 54 acts to prevent any unwanted and excessive vertical movement of post 58 relative to connector bracket 60 and strap 54.

Preferably, the relative dimensions of the mating surfaces of the support post 58 and connector bracket 60 are such as to have a close, i.e., snug sliding fit with one another. That is, this fit must be such so as not to have so "sloppy" a fit as to permit the support post 58 to be able to be unduly angularly skewed relative to the connector box walls 62 and 64. Thus, due to the generally vertical alignment of support post 58 by connector bracket 60, the baffle plate 56 is maintained in a fixed angled position relative to opening 106 of outlet pipe extension 50. Stated another way, the fixed interconnection between connector bracket 60 and support post 58 maintains the baffle plate 56 in a centrally aligned position (from left to right—see FIG. 3, and from front to back—see FIG. 2) relative to the opening 106 of extension pipe 50; this interconnection also acts to maintain the plate 56 at the desired angle α (see FIG. 2) relative to outlet line opening 106. As seen in FIGS. 2 and 3, the plate 56 is purposely formed somewhat larger in cross-sectional size than the opening 106, so as to effectively cover the same from rising gas bubbles 110.

In the preferred embodiment the baffle plate 56 and support post 58 are an integral unit preferably injection molded or otherwise cast out of plastic; thus, the plate 56 is able to be flexibly moved in a vertical place perpendicular to rear wall 64 of connector box 60; see the extended, flexibly-bent position of plate 56 shown in phantom in FIGS. 1 and 2. If the head of a septic tank cleaning unit (not shown) is forced through the sanitary tee 48, outlet pipe extension 50, and out opening 106, so as to be in a position to engage plate 56, then the plate 56 will be temporarily bent down out of the way (to the phantom position of FIG. 2). In this manner, neither baffle plate 56 nor support post 68 are damaged during tank cleaning. Plate 56 then will readily realign itself to its normal operating position of FIGS. 2 and 3 when the tank cleaning head (not shown) is removed. In the preferred embodiment, gusset wings 108 are used to strengthen the juncture of integrally-molded support post 58 and baffle plate 56.

In operation, the baffle plate 56 and downwardly-extending collector rim 96 cooperate to trap any upwardly-rising gas bubbles, which often carry solid particulate, that may try to enter the opening 106 of outlet extension pipe 50. As best seen in FIGS. 2, 4, and 8, the upwardly-rising gas bubbles 110 will contact the underneath surface 112 of baffle plate 56 and generally move therealong to the plate's peripheral edge until contacting rim 96. At that point, they are guided by rim 96 until reaching the opening 98, whereupon they are allowed to freely escape outside of pipe 50, generally going vertically up the rear surface 92 of support post 58. In this manner, the gas bubbles 110 and any associated particulate (not shown) are prevented from entering opening 106 of outlet line 44.

The present gas baffle device 52 can be readily installed in a new septic tank (preferably one having a sanitary tee 48 and outlet pipe extension 50), or alternatively, can be used in retrofit situations where a septic tank that is being repaired or cleaned can have its outlet line 44 similarly fitted with a sanitary tee 48 and pipe 50. Advantageously, with the present device, support post 58 can be adjusted relative to connector bracket 60. Thus, the relative height of gas baffle plate 56 can be adjusted relative to the opening 106 of outlet pipe extension 50. In one device made in accordance with the present invention, that height adjustment amounted to approximately 1½.

Importantly, the present invention's gas baffle device need not be formed or installed at the location of the septic tank manufacturer. Instead, it can be field-installed at the septic tank installation site. Further, the installer need not use any tools, but can simply hand-tighten the fastener 78 of strap 54 to mount the gas baffle device 52 to the septic tank's extended outlet line 50. Since in the preferred embodiment the present baffle device is made from injection-molded plastic materials, it is relatively inexpensive. Also, only one of the present baffle devices need be installed on that outlet opening of the septic tank which has the actual outlet line, rather than a device used with every potential outlet opening, as is required by many prior gas baffle devices. Advantageously, none of the tank 20 or its piping components, such as outlet line 44, sanitary tee 48, or extension pipe 50, need be modified for use with the present gas baffle device. If desired, the present baffle can even be made as one overall unit, i.e., with strap 54, post 58, and plate 56 all formed as one, preferably as an injection-molded plastic piece. Alternatively the combination baffle plate 56 and support post 58 can be made as separate pieces and then suitably joined during installation so as to be operable as described above.

From the foregoing, it is believed that those skilled in the art will readily appreciate the unique features and advantages of the present invention over previous types of gas baffle devices for on-site waste disposal systems. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A gas baffle apparatus for use in an on-site waste disposal tank so as to prevent entry of unwanted substances into the leach field, said gas, baffle comprising:
    a mounting strap securely fastened to an outlet line of an on-site waste disposal tank, said outlet line having an outlet opening;
    a gas baffle plate carried by said mounting strap and normally maintained thereby adjacent said outlet opening at an angle relative to the horizontal, said gas baffle plate operable to receive and deflect rising gas bubbles and any solid particulates so that said bubbles and particulates do not enter said outlet opening, said gas baffle plate further operable to be temporarily flexibly bent out of the way when engaged by any cleaning apparatus.

2. The invention of claim 1, and including a support post mounted to said mounting strap for carrying said gas baffle plate.

3. The invention of claim 2, wherein said support post and said gas baffle plate are formed as an integral unit.

4. The invention of claim 3, wherein said integral support post and gas baffle plate are formed of an injection moldable plastic material.

5. The invention of claim 1, wherein said support post extends generally downwardly from said mounting strap.

6. The invention of claim 1, wherein said mounting strap carries a connector bracket means for securely interconnecting said support post to said mounting strap.

7. The invention of claim 6, wherein said connector box means includes a detent opening and said support post includes a detent dimple so that said secure interconnection between said support post and said mounting strap can be maintained.

8. The invention of claim 7, wherein said support post is snuggly slidably received by said connector bracket means.

9. The invention of claim 8, wherein said connector bracket means include a stop wall operable to prevent excessive sliding movement of said support post relative to said connector bracket means.

10. The invention of claim 1, wherein said gas baffle plate at its peripheral edge carries a generally downwardly-extending collector rim for entrapping rising gas bubbles, and solid particulates, said rim being interrupted at a point spaced outwardly of said outlet opening for permitting the escape of any collected gas bubbles and particulate.

* * * * *